(12) United States Patent
Kato et al.

(10) Patent No.: US 7,005,402 B1
(45) Date of Patent: Feb. 28, 2006

(54) EXHAUST GAS PURIFYING CATALYST COMPOUND, CATALYST COMPRISING SAID COMPOUND AND METHOD FOR PREPARING THE COMPOUND

(75) Inventors: Yasuyoshi Kato, Kure (JP); Kouichi Yokoyama, Kure (JP); Masatoshi Fujisawa, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 204 days.

(21) Appl. No.: 10/415,320

(22) PCT Filed: Oct. 26, 2000

(86) PCT No.: PCT/JP00/07506

§ 371 (c)(1),
(2), (4) Date: Jul. 15, 2003

(87) PCT Pub. No.: WO02/34388

PCT Pub. Date: May 2, 2002

(51) Int. Cl.
*B01J 27/24* (2006.01)

(52) U.S. Cl. ............... 502/200; 502/305; 502/312; 502/321; 502/353; 502/350

(58) Field of Classification Search ............... 502/200, 502/305, 312, 321, 353, 350
See application file for complete search history.

(56) References Cited

U.S. PATENT DOCUMENTS

| | | | | |
|---|---|---|---|---|
| 3,678,091 A | * | 7/1972 | Reulet et al. ............... 558/322 |
| 4,001,316 A | * | 1/1977 | Ishimi ........................ 562/534 |
| 5,104,844 A | * | 4/1992 | Yamamoto et al. ......... 502/200 |
| 5,166,122 A | * | 11/1992 | Teshima et al. ............ 502/309 |
| 6,054,408 A | * | 4/2000 | Hums et al. ................ 502/217 |
| 2004/0229753 A1 | * | 11/2004 | Hibst et al. ................. 502/312 |

FOREIGN PATENT DOCUMENTS

| JP | 49-126616 | * | 4/1973 |
|---|---|---|---|
| JP | 2000-26123 | * | 1/2000 |

* cited by examiner

*Primary Examiner*—Christina Johnson
(74) *Attorney, Agent, or Firm*—Fay, Sharpe, Fagan, Minnich & McKee, LLP

(57) ABSTRACT

The invention is to provide (i) a catalyst which does not require an activation of catalyst components by means of a calcination which has become a hindrance in the way of obtaining a catalyst having a high activity through a conventional technology and in which catalyst the compositing of vanadium with molybdenum is contemplated more than enough; ii) a method for producing the catalyst; (iii) a catalyst having an activity, especially having an activity at low temperatures and a durability both greatly increased; (iv) a catalyst compound for purifying an exhaust gas, in which compound the ratio of vanadium atom to molybdenum atom (V/Mo) is 3/2 or close thereto and which compound is expressed by the rational formula $(NH_4)_x Mo_2 V_x O_{(3x+6)}$ wherein x is 2.8 to 3.2; and (v) a method for producing the catalyst compound through a step for reacting molybdenum oxide ($MoO_3$) with ammonium metavanadate ($NH_4VO_3$) in the co-presence of water for a prescribed period of time.

11 Claims, 2 Drawing Sheets

3: Titanium oxide
4: Mo-V compound
$(NH_4)_x Mo_2 V_x O_{(3x+6)}$ (A)

(B)

1: V compound
2: Mo compound

EXHAUST GAS PURIFYING CATALYST COMPOUND, CATALYST COMPRISING SAID COMPOUND AND METHOD FOR PREPARING THE COMPOUND

TECHNICAL FIELD

The present invention relates to a catalyst for purifying an exhaust gas. More specifically, the present invention relates to a catalyst excellent in the activity at low temperatures and resistance to SOx, and exhibiting a high activity in the reducing reaction of nitrogen oxides (NOx) with ammonia ($NH_3$) and oxidative decomposition reaction of dioxins, and relates to a method for producing the catalyst.

BACKGROUND ART

NOx contained in exhaust gases or flue gases discharged from power plants, various factories, automobiles, and others are causative agents for photochemical smog and acid rain. As an efficient method for removing the NOx, an exhaust gas or flue gas denitration method by a selective catalytic reduction using ammonia ($NH_3$) as reducing agent has widely been employed with thermal power plants being the places where the method is most frequently used. As the catalyst used for such an exhaust gas or flue gas denitration method, a titanium oxide ($TiO_2$) type catalyst containing vanadium (V), molybdenum (Mo), or tungsten (W) as an active component has been used. Especially, a catalyst containing vanadium as one active component has become a mainstream of current denitration catalysts since the catalyst is not only high in activity but also small in deterioration due to the impurities contained in the exhaust gases and usable at temperatures including temperatures lower than those used heretofore (Laid-open Japanese Patent Publication No. Sho 50-128681 and others). The catalyst has been used after being molded usually into a honeycomb-like or platelike shape, and various methods for producing the catalyst has been devised.

Besides, a fact that dioxins having a high toxicity are contained in exhaust gases discharged from incinerators burning municipal refuses or industrial wastes has become a social problem in recent years. Thus, the catalysts which perform a denitration reaction and oxidatively decompose dioxins at the same time have been invented.

Many of the catalysts described above are ordinarily prepared by (i) a method in which particles of a titanium oxide, and particles of salts of active components such as V, Mo, and W of a catalyst or particles of an oxide are kneaded together with water, and the mixture thus obtained is molded and calcined (kneading method), or (ii) another method in which a molded and calcined article of a titanium oxide is impregnated with a solution of a mixture of the salts of active components of a catalyst (impregnation method) (Laid-open Japanese Patent Publication No. Sho 50-128681, Japanese Patent Publication No. Sho 53-34195, and others).

The kneading method and impregnation method described above both of which fall within conventional technology can not always be said to be best methods for preparing the catalysts when viewed from the aspect of the activity of catalysts, and many angles undesirable exist in the methods especially when the catalyst having a high activity at low temperatures are to be obtained.

The problems contained in the methods are enumerated with the problems being separated into those belong to kneading method or those belong to the impregnation method as follows:

1) Kneading Method
   ① In order to obtain a catalyst (final product) having a high activity, it is necessary to activate added salts of active components contained in a molded catalyst through calcination thereof. However, since a titanium oxide and active components contained in the molded catalyst are sintered by the calcination, it is difficult to obtain a catalyst (final product) having a high activity at low temperatures.
   ② So-called compositing effects of V with Mo or W is not sufficient because particles of a titanium oxide, and salts of active components such as V, Mo, and W, or particles of an oxide once become a state in which all of them coexist as they are by the kneading, and then they are composited only after they were subjected to a calcination. Accordingly, the kneading method leads to the formation of a catalyst (final product) having a small improvement in the durability and having a small resistance to SOx.

2) Impregnation Method
   ① Like the kneading method, it is necessary to activate the active components by calcining a molded catalyst. Accordingly, it is impossible to avoid the active components from being sintered, and thus a catalyst having a high activity, especially a high activity at low temperatures can not be obtained.
   ② Since a catalyst molded and calcined in advance is impregnated with active components in the impregnation method, compositing of the active components become easy compared with the kneading method. On the other hand, however, the concentrations of active components become different between the inside and the surface of a catalyst, it is difficult to maintain the ratio of two or more active components within a catalyst at a constant value, and thus most suitable compositing effects can not be expected, because the active components are adsorbed by a titanium oxide in the process of the impregnation.

In order to overcome the problems in the background art described above,
   (i) combined methods of a kneading method with an impregnation method such as an impregnation method in which a titanium oxide-molybdenum oxide carrier is impregnated with a vanadium salt and another impregnation method in which a titanium oxide carrier is impregnated sequentially with W, V, and others; and
   (ii) improvements in the impregnation method have been attempted.

However, it can hardly be said that sufficient-effects can be obtained by those methods.

DISCLOSURE OF THE INVENTION

The subjects of the present invention are to provide a catalyst which does not require the activation of catalyst components by a calcination which has become a hindrance in the way of obtaining a catalyst having a high activity through conventional technology and in which catalyst the compositing of vanadium with molybdenum to form a composite material is contemplated more than enough, and a method for producing such catalyst, and to provide a catalyst having a high activity, especially having an activity at low temperatures and a durability both greatly increased.

The method adopted in the present invention in order to achieve the subjects described above is one in which (i) a molybdenum-vanadium (Mo—V) composite compound (hereinafter, "composite compound" is sometimes referred to as "compound" for brevity) having a specific composition which is not necessary to be activated through a calcination is used as an active component, and a carrier comprising a titanium oxide as a main component is impregnated with the compound; or (ii) the composite compound is added to particles or powders of a titanium oxide and then kneaded.

Accordingly, the present invention is summarized as follows:

(1) A catalyst compound for purifying an exhaust gas, in which compound the ratio of vanadium atom to molybdenum atom (V/Mo) is 3/2 or close thereto and which compound is expressed by the rational formula

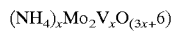

wherein x is 2.8 to 3.2.

(2) A catalyst for purifying an exhaust gas, in which catalyst the water soluble compound recited in paragraph (1) above is supported on a carrier.

(3) A catalyst for purifying an exhaust gas, which catalyst is produced through a step for impregnating a titanium oxide carrier with the water soluble compound recited in paragraph (1) above, or a step for kneading powders of a titanium oxide together with the water soluble compound.

(4) The catalyst for purifying an exhaust gas according to paragraph (2) or (3) above wherein the catalyst is produced by further subjecting the catalyst recited in paragraph (2) or (3) above to a calcination at a temperature lower than 500° C.

(5) A process for producing the catalyst compound recited in paragraph (1) above, which process comprises a step for reacting molybdenum oxide ($MoO_3$) with ammonium metavanadate ($NH_4VO_3$) in the co-presence of water for a prescribed period of time.

(6) A composition used for a catalyst for purifying an exhaust gas, which composition comprises the water soluble compound recited in paragraph (1) above and a sol-like substance such as a silica sol.

(7) A catalyst for purifying an exhaust gas, in which catalyst the composition recited in paragraph (6) above is supported on a carrier.

(8) A process for producing a catalyst for purifying an exhaust gas, which process comprises a step for having a mixture of the water soluble compound recited in paragraph (1) above with a sol-like substance such as a silica sol supported on a titanium oxide carrier or a step for blending the mixture with powders of a titanium oxide, after the water soluble compound was mixed with the sol-like substance in advance.

The Mo—V composite compound used in the present invention is one which was found by the present inventors as a result of diligent investigations for solving the problems in the conventional technology described above. The compound is a reddish brown substance produced by adding ammonium metavanadate ($NH_4VO_3$) and molybdenum trioxide ($MoO_3$) into water so that the ratio of vanadium atom to molybdenum atom (V/Mo) becomes 3/2 (or 6/4) or close thereto and then stirring them for a prescribed period of time (usually more than 10 hours). The compound is characterized by having a solubility as large as 170 g/l at a normal temperature. Whereas the attempts to determine the structure of the compound have been made by the present inventors, only the fact that the compound is a reddish brown compound formed when ammonium metavanadate which is hardly soluble in water and molybdenum trioxide were added in water and then stirred for a long period of time, has the ratio of vanadium to molybdenum (V/Mo) of 3/2 or close to 3/2, and has a high solubility is known at the present time. In this connection, attempts were made by the present inventors to prepare a compound similar to the compound of the present invention by using the combination of molybdenum trioxide ($MoO_3$) with divanadium pentoxide ($V_2O_5$), ammonium metavanadate ($NH_4VO_3$) with ammonium molybdate (($NH_4)_6Mo_7O_{24}O_{24}·4H_2O$), ammonium paratungstate hexahydrate (($NH_4)_{10}H_{10}·W_{12}O_{46}·6H_2O$) with ammonium metavanadate, or ammonium metavanadate with tungsten trioxide ($WO_3$) as starting raw materials. However, the formation of a compound having such a high solubility as described above from the attempts using the combinations was not noticed. Accordingly, the term "molybdenum-vanadium (Mo—V) compound" as used hereinafter is intended to mean a stable, reddish brown compound having a high solubility and formed when ammonium metavanadate and molybdenum oxide were stirred together with water. The compound of the present invention has a high activity by itself. Thus, when the compound of the present invention was added to a titanium oxide, it is not necessary to calcine the mixture anew to activate. Besides, since molybdenum and vanadium are formed into a stable compound or composite in the present invention, the compound of the present invention is hardly erroded by the SOx contained in exhaust gases and provide a catalyst having a high durability.

When the catalyst of the present invention is produced, an operation in which a carrier of a titanium oxide which carrier is prepared in advance is impregnated with a solution containing the Mo—V compound described above at a prescribed concentration and then dried is adopted. Since the Mo—V compound exhibits a high activity even immediately after the drying, the activation of the compound through its calcination is not necessary. However, a step of calcination may be added, when desired.

Further, it is possible-to-obtain the catalyst employing the Mo—V compound of the present invention can be obtained not only by the impregnation method described above, but also by a method in which the Mo—V compound is added to powders of a titanium oxide, molded, and then dried, and further subjected to a calcination, if necessary.

Moreover, since the Mo—V compound used in the catalyst of the present invention is very stable, the compound is not decomposed even when mixed with a sol-like substance such as a silica sol. Thus, a catalyst high both in activity and strength can be obtained by applying a solution of the mixture of the Mo—V compound and the sol-like substance to a titanium oxide carrier to have the mixture supported by the carrier.

As described above, the essence of the present invention resides in the use of a novel composition of matter comprising Mo—V compound discovered by the present inventors. Accordingly, the scope of the present invention is not limited by the fact that inorganic fibers, other catalyst components, or inorganic or organic bonding agents are included in the catalyst or titanium oxide. Besides, while a catalyst having a highest activity and a longest durability can be obtained when the activation by a calcination of the (molded) catalyst is not performed, the calcination may be conducted at a temperature lower than 500° C., when required, depending on the strength and use conditions of the catalyst. While the amount of the Mo—V compound to be permeated into a titanium oxide for impregnation of or to be mixed with the titanium oxide is not limited, preferable results tend to be obtained usually when the amount is selected so that the amount of the Mo—V compound becomes less than 20% (by weight, the same basis is also applied hereinafter) and desirably less than 10% of the titanium oxide.

[Function]

In order to explain the functions in and the effects of the catalyst of the present invention, the problems of the catalysts obtained by a conventional kneading method or impregnation method are first described. FIG. 2(A) is a schematic diagram for illustrating the cross section of a surface layer of a catalyst obtained by a conventional kneading method before it is subjected to a calcination. As will be understood from the diagram, V (vanadium) compound 1 and Mo (molybdenum) compound 2 added as active components become particles of each compound at a step of drying them, and particles of the compounds and particles of a titanium oxide exist in a mixed state. In order that a catalyst at this state exhibits an activity, the active components are necessary to be calcined to become oxides. Besides, in order that the particles of the V compound and particles of the Mo compound existing at separated positions are composited to develop compositing effects such as an increase of durability of the catalyst, the components are necessary to be calcined at a higher temperature to diffuse by heat thereby to react with each other. When the catalyst was calcined, however, sintering of not only the active components but also the titanium oxide proceed. As the result, a catalyst having a small specific surface is produced, and thus a high activity of the catalyst can not be expected. Further, the compositing of the active components through the heat diffusion cannot be said to be sufficient even in the aspect of the increase of durability of the catalyst since all the active components cannot uniformly react in the heat diffusion.

FIG. 2(B) is a schematic diagram for illustrating the cross section of a surface layer of a catalyst obtained by a conventional impregnation method in the step of the drying of the catalyst. Even in the case of the impregnation method, particles of each of the active components are deposited or exist separately on the surface of particles of titanium dioxide ($TiO_2$) 3 at the step of drying of the catalyst, and thus it is needless to say that the activation or compositing of the active components through a calcination is necessary. Besides, as a problem peculiar to the conventional impregnation method, a distribution of each of the active components occurs within a catalyst due to the difference in the affinity (adsorptivity) between the titanium oxide and each of the active components contained in a solution of a mixture of the components used for the impregnation. Accordingly, it becomes most difficult to maintain a certain ratio of the active components uniformly through a whole catalyst, and thus it is also difficult to obtain a high durability through the compositing of active components with each other.

On the other hand, FIG. 1 is a schematic diagram for illustrating the cross section of a surface layer of a catalyst of the present invention. As will be clearly understood from FIG. 1, in a catalyst of the present invention, an active Mo component and an active V component exist on the surface of titanium dioxide particles 3 as particles 4 in a composited state already at the stage where the drying of a catalyst was completed, because the catalyst of the present invention is produced by impregnating a catalyst carrier with a solution of a Mo—V compound which was found anew by the present inventors and has a high stability, to make the carrier support the Mo—V compound. Accordingly, it is not necessary to composite the active compounds again through a calcination. Moreover, the catalyst of the present invention does not require the activation through a calcination since the Mo—V compound supported on the carrier has a high activity by itself. Accordingly, a clacination step causing the sintering of active components and a titanium oxide is unnecessary for the catalyst of the present invention. Keeping with such an advantage, it becomes possible to obtain a catalyst having a high activity, particularly an extremely high activity at low temperatures which requires a high surface area of a catalyst. Even when a calcination step is adopted in the process for producing the catalyst of the present invention for the reasons other than the activation or compositing, the calcination can sufficiently be performed at a lowest temperature necessary for its purpose, and it becomes possible to easily obtain a catalyst having a high activity. Moreover, noteworthy is the fact that a specific ratio of Mo/V of the active components added is maintained everywhere within the catalyst of the present invention. Based on this fact, not only a specific compositing treatment is unnecessary, but also it becomes possible to obtain a catalyst having a high activity and durability at all times according to the present invention.

More advantageous points of the present invention are that the Mo—V compound newly discovered is remarkably stable, that the compound is not broken even when mixed with a silica sol or titanium dioxide ($TiO_2$), and that the compound can be used as a solution of a mixture with a silica sol for the impregnation or can be used for the kneading with the titanium dioxde. Based on these facts, it becomes possible to use the active components together with a colloidal silica, which has a large effect of increasing strength, at the same time for the impregnation or kneading, and thus it becomes possible to considerably simplify the manufacturing processes of the catalyst.

Further, the Mo—V compound used in the present invention is characterized in that the compound is uniformly supported by a carrier even down to the inside of the catalyst since the affinity of the compound for titanium dioxide is small. The catalyst of the present invention is advantageous even in this point since all the active points in a whole catalyst are employed in a denitration at a low temperature around 200° C. used for an exhaust gas such as an exhaust gas from a municipal refuse incinerator. Besides, whereas the deterioration of a denitration catalyst with SOx tend to become remarkable at low temperatures, it becomes possible to obtain a catalyst having a high resistance to SOx in such an extent as that which was not expectable heretofore since the Mo—V compound supported is stable and does not readily react with SOx.

In addition, the catalyst of the present invention exhibits high performances even in the oxidative decomposition of chlorine containing organic compounds, and is most suitable as a catalyst for denitrating an exhaust gas discharged from a municipal refuse incinerator and removing dioxins from the exhaust gas for which a catalyst is required to have both the resistance and the activity of oxidizing chlorine containing compounds such as dioxins at the same time at around 200° CH.

Figure 1:
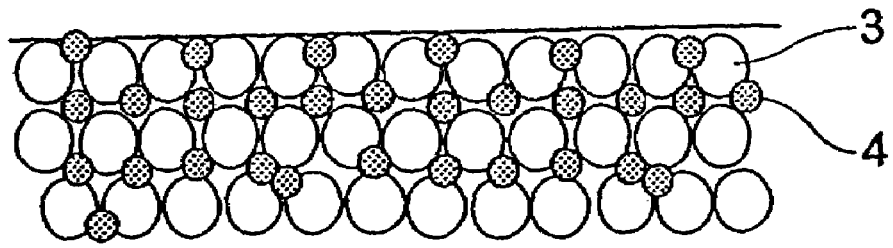
FIG. 1 is a schematic diagram for illustrating the cross section of a surface layer of a catalyst of the present invention and showing the state of the distribution of active components in the catalyst.
Figure 2:
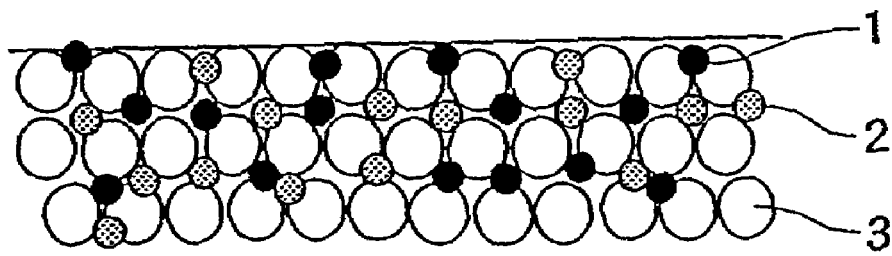
FIG. 2 shows a schematic diagram similar to that of FIG. 1 showing the state of the distribution of active components in a catalyst according to a conventional technology.
Figure 2:
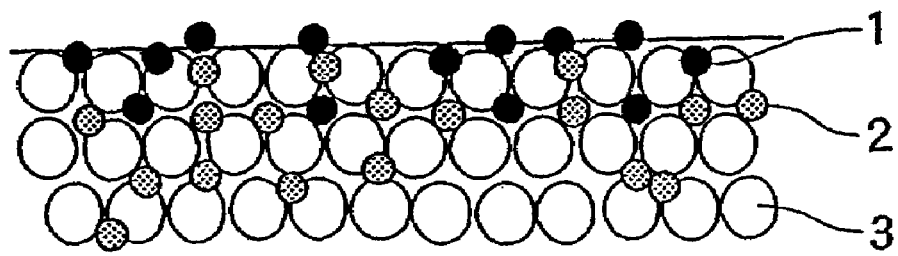

In the drawings, the meanings of the referential numerals are as follows:

1 . . . V compound, 2 . . . Mo compound, 3 . . . a titanium oxide, and 4 . . . Mo—V compound used in the present invention.

BEST MODE FOR CARRYING THE INVENTION

Now, the present invention will be described in more detail with reference to specific examples. However, it should be understood that the scope of the present invention is by no means limited by such specific examples.

EXAMPLE 1

A slurry prepared by adding 40.6 g of molybdenum trioxide ($MoO_3$) and 49.4 g of ammonium metavanadate ($NH_4VO_3$) into 410 g of water was gently stirred at a room temperature for 20 hours to react both compounds with each other thereby completely dissolve in the water. In the solution thus obtained, the concentration of the Mo—V compound was about 18% by weight, and the ratio of the V atom to the Mo atom (V/Mo) in the compound was 3/2. The reddish brown substance thus formed and dissolved in the water can be expressed by the rational formula $(NH_4)_3Mo_2V_3O_{15}$.

COMPARATIVE EXAMPLE 1

A slurry prepared by adding 49.8 g of ammonium molybdate $((NH_4)_6 \cdot Mo_7O_{24} \cdot 4H_2O)$ and 49.4 g of ammonium metavanadate ($NH_4VO_3$) into 410 g of water was gently stirred at a room temperature for 20 hours. In this case, although the concentration of the solid substance in the slurry at the stage when the stirring was completed was about 18% by weight and the ratio of the V atom to the Mo atom (V/Mo) in the slurry was 3/2 in common with the results in Example 1, the ammonium metavanadate was not dissolved in the water and a reddish brown product was not obtained.

COMPARATIVE EXAMPLE 2

A slurry prepared by adding 49.8 g of ammonium molybdate $((NH_4)_6 \cdot Mo_7O_{24} \cdot 4H_2O)$ and 38.4 g of vanadium pentoxide ($V_2O_5$) into 410 g of water was gently stirred at a room temperature for 20 hours. In this case, although the concentration of the solid substance in the slurry at the stage when the stirring was completed was about 18% by weight and the ratio of the V atom to the Mo atom (V/Mo) in the slurry was 3/2 in common with the results in Example 1, the vanadium pentoxide was not dissolved in the water and a reddish brown product was not obtained.

COMPARATIVE EXAMPLE 3

A slurry prepared by adding 65.4 g of tungsten trioxide ($WO_3$) and 49.4 g of ammonium metavanadate ($NH_4VO_3$) into 410 g of water was gently stirred at a room temperature for 20 hours in the attempt to react both compounds with each other thereby to completely dissolve in the water. Although the ratio of the V atom to the W atom (V/W) in the slurry was 3/2 in common with the results in Example 1, both added compounds were scarcely dissolved in the water, and a reddish brown product was not obtained.

As will be clear from the results in Example 1, and Comparative Examples 1 to 3, a reddish brown-substance formed in Example 1, and having the ratio of the V atom to the Mo atom (V/Mo) of 3/2 and a high solubility in water can be considered to be a specific substance formed by the reaction of ammonium metavanadate with molybdenum trioxide in water. Thus, it has been found that the specific compound is not formed when a starting raw material is different and that even when a tungsten oxide which is a homologue of the molybdenum compound is used in place of the latter compound, the specific compound is not resulted.

EXAMPLE 2

A net-like product prepared by weaving twisted yarns each comprising 1400 E glass fibers having a fiber diameter of 9 μm at a roughness of 10 yarns/inch into a plain weaving was impregnated with a slurry containing 40% of a titania, 20% of a silica sol, and 1% of a polyvinyl alcohol, and then dried at 150° C. to obtain a catalyst substrate imparted with a stiffness.

On the other hand, 1.5 kg of a titanium oxide having a specific surface area of about 230 $m^2/g$ was added to 75 g of oxalic acid, water was added thereto to form a paste-like substance, and then 300 g of silica.alumina fibers were added thereto and kneaded until a homogenous paste was obtained in a separate step.

The paste thus obtained was placed between two sheets of the catalyst substrates obtained by the procedures described above, and they were passed through pressure rolls to obtain a sheet having a thickness of 0.7 mm and containing the titania. This sheet was dried at a room temperature and then calcined at 400° C. for 2 hours to obtain a titania carrier.

This titania carrier was immersed in the solution of the Mo—V compound synthesized in Example 1 to support the Mo—V compound and then dried at 80° C. for 2 hours. The contents of molybdenum trioxide ($MoO_3$) and divanadium pentoxide ($V_2O_5$) in the catalyst thus obtained were 4.8% by weight and 4.5% by weight based on the amount of titanium dioxide ($TiO_2$), respectively.

COMPARATIVE EXAMPLE 4

A net-like product prepared by weaving twisted yarns each comprising 1400 E glass fibers having a fiber diameter of 9 μm at a roughness of 10 yarns/inch into a plain weaving was impregnated with a slurry containing 40% of a titania, 20% of a silica sol, and 1% of a polyvinyl alcohol, and then dried at 150° C. to obtain a catalyst substrate imparted with a stiffness.

On the other hand, 88.3 g of ammonium molybdate and 75 g of oxalic acid were added to a mixture of 1.5 kg of a titanium oxide having a specific surface area of about 230 $m^2/g$ and 86.7 g of ammonium metavanadate, water was added thereto to form a paste-like substance, and then 300 g of silica.alumina fibers were added thereto and kneaded until a homogenous paste was obtained in a separate step.

The paste thus obtained was placed between two sheets of the catalyst substrates obtained by the procedures described above, and they were passed through pressure rolls to obtain a sheet having a thickness of 0.7 mm. This sheet was dried at a room temperature and then dried at 80° C. for 2 hours to obtain a catalyst.

The contents of molybdenum trioxide ($MoO_3$) and divanadium pentoxide ($V_2O_5$) in the catalyst thus obtained were 4.8% by weight and 4.5% by weight based on the amount of titanium dioxide ($TiO_2$), respectively.

EXAMPLES 3 to 6

The same catalysts as that obtained in Example 2 were calcined at 200, 300, 400, and 500° C., respectively, for 2 ours to prepare separate catalysts.

COMPARATIVE EXAMPLES 5 to 8

The same catalysts as that obtained in Example 4 were calcined at 200, 300, 400, and 500° C., respectively, in the same manner as in Comparative Examples 2 to 5 to prepare separated catalysts.

COMPARATIVE EXAMPLES 9 and 10

Ammonium metavanadate in an amount of 8.67 g and 8.83 g of ammonium molybdate were dissolved in 41 cm³ of 10% aqueous solution of monomethyl amine. In the solution thus obtained was immersed the same titania carrier as that used in Example 2 to impregnate, and then the carrier was dried first at a room temperature and then at 80° C. to obtain the catalyst of Comparative Example 9.

The same catalyst as that of Comparative Example 9 was further calcined at 500° C. for 2 hours to obtain the catalyst of Comparative Example 10.

Figure 3:
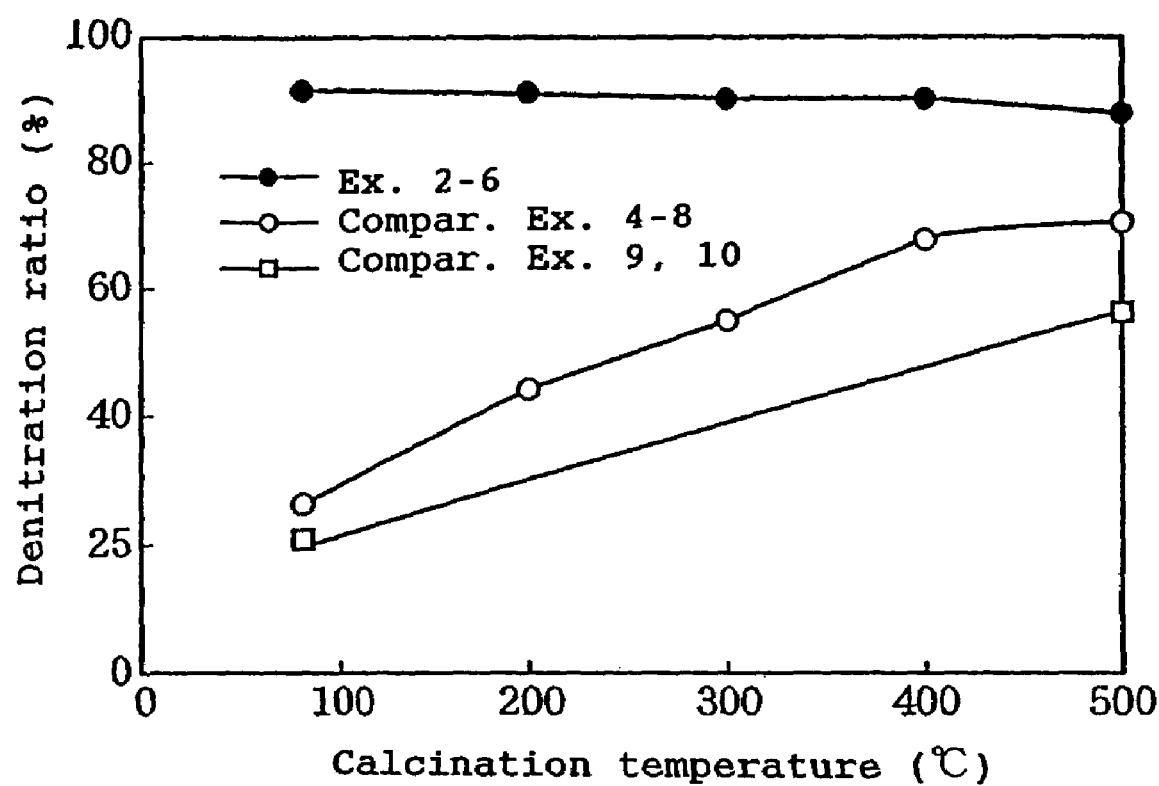
FIG. 3 is a graph comparing the performances of catalysts obtained in the Examples of the present invention and Comparative Examples thereto, respectively.

Each of the catalysts obtained by Examples 2 to 6 and Comparative Examples 4 to 10, respectively, were cut into strips of 20 mm×100 mm, and then subjected to denitration tests under the conditions as shown in Table 1. The results thus obtained are shown in FIG. 3 as the relation between the calcining temperatures of catalysts and denitration ratios. In this connection, the drying temperature was assumed to be a portion of the calcination temperature, and the data of the catalysts subjected only to drying are included in FIG. 3.

As will be clear from FIG. 3, the catalysts of the present invention exhibit an extremely high activity. In addition, whereas the catalysts of Comparative Examples do not exhibit a high activity unless they were calcined at a temperature higher than 400° C., the catalysts of the present invention, for example, even the catalyst obtained by Example 2 in which the calcination was not conducted at all exhibited the same extent of excellent performances as those exhibited by calcined catalysts. From this fact, it is evident that the catalysts of the present invention are not necessary to be subjected to such an activating treatment as a calcination, and thus that the catalysts of the present invention have large advantages in the activity and production cost of catalysts.

TABLE 1

| Temperature (° C.) | 200 |
| --- | --- |
| Aerial velocity (m/h) | 17 |
| Gas composition | |
| NO | 200 |
| $NH_3$ | 240 |
| $O_2$ | 10 |
| $CO_2$ | 6 |
| $H_2O$ | 6 |

On the other hand, the catalysts obtained by Examples 2 and 6, and Comparative Examples 4, 8, 9, and 10, respectively, were exposed to an exhaust gas containing 200 ppm of $SO_2$ at 200° C. for 100 hours to determine the extents in which the activities of the catalysts are lowered by the $SO_2$. That is, the performances of the catalysts at 200° C. before and after the exposure to the $SO_2$ containing gas were determined under the conditions shown in Table 1. The results thus obtained are shown in Table 2.

TABLE 2

| Catalyst | Initial denitration ratio (%) | Denitration ratio after subject to $SO_2$ treatment (%) |
| --- | --- | --- |
| Example 2 | 92 | 85 |
| Example 6 | 89 | 80 |
| Comparative Example 4 | 27 | 5 |
| Comparative Example 8 | 71 | 20 |
| Comparative Example 9 | 21 | 2 |
| Comparative Example 10 | 56 | 14 |

As will be understood from Table 2, any of the catalysts of Comparative Examples were considerably lowered in activity by the exposure to the $SO_2$ containing gas. On the contrary, the catalysts of the Examples were extremely small in the lowering of the activity. Particularly, it can be found that the catalyst of Example 2 is smallest in the lowering of the activity compared with other catalysts. This is considered to be due to the fact that the catalysts of Examples are not easily affected by SOx in addition to the fact that the compounds are supported in the catalyst in the form of Mo—V compound and thus the compositing of molybdenum with vanadium is sufficient.

As described above, it was found that not only the catalysts having a high activity can be obtained without a calcination according to the present invention, but also the catalysts of the present are remarkably excellent even in the aspect of durability.

In order to describe the effects of the present invention more specifically, other examples are shown below.

EXAMPLE 7

A catalyst was prepared by the same manner as in Comparative Example 4 with the exception that the solution of the Mo—V compound prepared in Example 1 was used instead of the solution of ammonium molybdate and ammonium metavanadate in Comparative Example 4.

EXAMPLE 8

To the same solution of the Mo—V compound as that prepared in Example 1 was added 500 g of a colloidal silica (produced by Nissan Chemical Industry Co., Ltd.; trade name: Silica sol-o) containing $SiO_2$ in an amount of 20% by weight to obtain a solution of a mixture of both components. By using this solution, a catalyst was prepared by the same manner as in Example 2.

COMPARATIVE EXAMPLE 11

A solution was prepared by adding 50 g of a colloidal silica (Silica sol-o described above) to the same aqueous solution of monomethyl amine containing a mixture of ammonium metavanadate and ammonium molybdate as used in Comparative Example 9. By using the solution thus obtained, a catalyst was prepared in the same manner as that in Comparative Example 9.

EXAMPLE 9

Denitration activity was determined at 200° C. by using the same catalyst as that obtained by Example 4, and the oxidation ratio of chlorobenzene by the catalyst was determined at the same time by adding chlorobenzene as a quasi dioxin substance in an amount of 10 ppm to the exhaust gas.

Performance tests of the catalyst obtained by Example 7 were conducted in the same manner as that used in Example 2. The results thus obtained are shown in Table 3 together with the results in Example 2. It can be understood from Table 3 that even when a Mo—V compound was used as a starting raw material for the catalyst in the kneading method as shown in the line for Example 7 in Table 3, the same extent of high catalyst performances are obtained as in the case of the impregnation method.

TABLE 3

| Catalyst | Method for adding Mo-V compound | Denitration ratio (%) |
|---|---|---|
| Example 2 | Impregnation method | 92 |
| Example 7 | Kneading method | 91 |

Besides, the activities at 200° C. and the results of bending strength tests of both catalysts obtained by Example 8 and Comparative Example 11, respectively, are collectively shown in Table 4. As will be understood from Table 4, the catalyst of Comparative Example 11 is not only low in the activity but also has an extremely low value in the bending strength compared with the catalyst of Example 8. This is presumed to be due to the fact that the silica sol and the vanadium salt were changed to a gel-like substance by the mixing of the aqueous solution of a mixture of the molybdenum salt and vanadium salt with a silica sol, and thus the gel-like substance was not penetrated into a titania carrier. As will be clear from this example, according to the present invention, it is possible to make a carrier support a strength increasing agent of a catalyst and an active component thereon at the same time since the Mo—V compound of the present invention can arbitrarily be mixed with a silica sol, and thus, catalysts having a high strength and a high activity can be obtained through simple procedures.

TABLE 4

| Catalyst | Denitration ratio (%) | Bending strength (kg/cm²) |
|---|---|---|
| Example 8 | 72 | 140 |
| Comparative Example 11 | 14 | 60 |

As a result of the tests conducted in Example 9, it was also found that catalysts of the present invention exhibit such a high activity for oxidatively decompose chlorobenzene as 80% or more. As described above, the catalysts of the present invention are not only excellent in the activity at such a low temperature as 200° C., but also are hardly deteriorated by the SOx contained in exhaust gases from refuse incinerators, and are excellent in the activity for oxidizing chlorine-containing organic compounds which are quasi dioxin substances, in addition. While it is desired to decompose dioxins and to perform denitration at the same time in refuse incinerators number of which is increasing more and more in recent years, the catalysts of the present invention are remarkably excellent ones matched with such social needs.

INDUSTRIAL APPLICABILITY

According to the present invention, a catalyst compound which has a catalytic activity but does not need an activating step by a calcination can be obtained. A catalyst having the compound supported on a carrier, or included therein by kneading is excellent in the activity at low temperatures, durability, and the activity for decomposing dioxins, and thus it becomes possible to make refuse incinerators, apparatuses for purifying exhaust gases, and the likes highly efficient. Besides, since a calcination as a treatment for activating the active components of a catalyst become unnecessary, not only simplification of manufacturing steps of a catalyst becomes possible, but also it becomes possible to design a catalyst with the emphasis being placed on the catalyst activity, and various improvements in the performances and economical aspects of the catalyst become possible. Further, the Mo—V compound used in the present invention is not only stable even when mixed with a sol-like substance such as a silica sol, but also does not form a gelation of a sol. Accordingly, it is possible to support an active component at the same time in an impregnation step of a catalyst with a silica sol conducted for the purpose of increasing the strength of the catalyst, and it becomes possible to obtain a catalyst having a high strength and a high catalytic activity through simple steps.

What is claimed is:

1. A catalyst compound for purifying an exhaust gas, in which compound the ratio of vanadium atom to molybdenum atom (V/Mo) is 1.4 to 1.6 and which compound is expressed by the rational formula $$(NH_4)_x Mo V_x O_{(3x+6)}$$

wherein x is 2.8 to 3.2.

2. A process for producing the catalyst compound defined in claim 1, which process comprises a step for reacting molybdenum oxide ($MoO_3$) with ammonium metavanadate ($NH_4VO_3$) in the presence of water for a prescribed period of time.

3. A catalyst for purifying an exhaust gas, comprising a water soluble compound supported on a carrier, the water soluble compound being expressed by the rational formula $$(NH_4)_x Mo_2 V_x O_{(3x+6)}$$

wherein x is 2.8 to 3.2 and the ratio of vanadium atom to molybdenum atom is 1.4 to 1.6.

4. The catalyst for purifying an exhaust gas according to claim 3 wherein the catalyst is produced by further subjecting the catalyst to a calcination at a temperature lower that 500° C.

5. A composition used for a catalyst for purifying an exhaust gas, which composition comprises a water soluble compound and a sol-like substance, the water soluble compound being expressed by the rational formula $$(NH_4)_x Mo_2 V_x O_{(3x+6)}$$

wherein x is 2.8 to 3.2 and the ratio of vanadium atom to molybdenum atom is 1.4 to 1.6.

6. A catalyst for purifying an exhaust gas, in which catalyst the composition defined in claim 5 is supported on a carrier.

7. A composition according to claim 5, wherein the sol-like substance is a silica-sol.

8. A process for producing a catalyst for purifying an exhaust gas, which process comprises a step for having a mixture of a water soluble compound with a sol-like substance supported on a titanium oxide carrier, or a step for blending the mixture with powders of a titanium oxide, after the water soluble compound was mixed with the sol-like substance in advance, the water soluble compound being expressed by the rational formula $$(NH_4)_x Mo_2 V_x O_{(3x+6)}$$

wherein x is 2.8 to 3.2 and the ratio of vanadium atom to molybdenum atom is 1.4 to 1.6.

9. A process according to claim 8, wherein the sol-like substance is a silica-sol.

10. A catalyst for purifying an exhaust gas, which catalyst is produced through a step for impregnating a titanium oxide carrier with a water soluble compound, or a step for kneading powders of a titanium oxide together with the water soluble compound, the water soluble compound being expressed by the rational formula $$(NH_4)_x MO_2 V_x O_{(3x+6)}$$

wherein x is 2.8 to 3.2 and the ratio of vanadium atom to molybdenum atom is 1.4 to 1.6.

11. The catalyst for purifying an exhaust gas according to claim 10 wherein the catalyst is produced by further subjecting the catalyst to a calcination at a temperature lower than 500° C.

* * * * *